(12) United States Patent
Busseuil et al.

(10) Patent No.: US 7,790,280 B2
(45) Date of Patent: *Sep. 7, 2010

(54) STRUCTURAL REINFORCEMENT

(75) Inventors: Dominique Busseuil, Lux (FR); Jean Philippe Bourdin, Obernai (FR); Eric Le Gall, Strasbourg (FR); Serge Bieber, Haegen (FR); Jean Philippe Lutz, Strasbourg (FR)

(73) Assignee: Zephyros, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,460

(22) Filed: Jun. 15, 2005

(65) Prior Publication Data

US 2005/0276970 A1    Dec. 15, 2005

Related U.S. Application Data

(63) Continuation of application No. 10/008,194, filed on Nov. 8, 2001, now Pat. No. 6,941,719.

(30) Foreign Application Priority Data

May 8, 2001    (GB)    ................. 0111151.7

(51) Int. Cl.
*B32B 3/26* (2006.01)
*B32B 7/12* (2006.01)
*B60J 7/00* (2006.01)

(52) U.S. Cl. ............... 428/304.4; 428/343; 296/203.02; 296/205; 296/187.01

(58) Field of Classification Search .............. 428/304.4, 428/343; 296/187, 205, 203.02
See application file for complete search history.

(56) References Cited

U.S. PATENT DOCUMENTS

| 3,400,182 | A | 9/1968 | Kolt |
| 3,868,796 | A | 3/1975 | Bush |
| 4,463,870 | A | 8/1984 | Coburn, Jr. et al. |
| 4,610,836 | A | 9/1986 | Wycech |
| 4,695,343 | A | 9/1987 | Wycech |
| 4,732,806 | A | 3/1988 | Wycech |
| 4,751,249 | A | 6/1988 | Wycech |
| 4,769,391 | A | 9/1988 | Wycech |

(Continued)

FOREIGN PATENT DOCUMENTS

DE    197 03 429 A1    8/1998

(Continued)

OTHER PUBLICATIONS

Copending U.S. Appl. No. 09/459,756, filed Dec. 10, 1999.

(Continued)

*Primary Examiner*—Victor S Chang
(74) *Attorney, Agent, or Firm*—Dobrusin & Thennisch PC

(57) ABSTRACT

A structural reinforcement for a hollow member comprising a rigid reinforcing member having a shape that substantially conforms to the cross section of the hollow member to be reinforced with an expandable adhesive material over at least a portion of the surface of the structural reinforcement having one or more extensions on its external surface which control and direct the direction in which the adhesive material expands to bond the reinforcing member to the internal surface of the hollow member, some of the extensions also provide improved reinforcement.

18 Claims, 7 Drawing Sheets

U.S. PATENT DOCUMENTS

| | | |
|---|---|---|
| 4,769,951 A | 9/1988 | Kaaden |
| 4,810,548 A | 3/1989 | Ligon, Sr. et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,194,199 A | 3/1993 | Thum |
| 5,266,133 A | 11/1993 | Hanley et al. |
| 5,288,538 A | 2/1994 | Spears |
| 5,344,208 A | 9/1994 | Bien et al. |
| 5,358,397 A | 10/1994 | Ligon et al. |
| 5,373,027 A | 12/1994 | Hanley et al. |
| 5,506,025 A | 4/1996 | Otto et al. |
| 5,575,526 A | 11/1996 | Wycech |
| 5,598,610 A | 2/1997 | Torigoe et al. |
| 5,631,027 A | 5/1997 | Takabatake |
| 5,660,116 A | 8/1997 | Dannawi et al. |
| 5,755,486 A | 5/1998 | Wycech |
| 5,819,408 A | 10/1998 | Catlin |
| 5,884,960 A | 3/1999 | Wycech |
| 5,888,600 A | 3/1999 | Wycech |
| 5,892,187 A | 4/1999 | Patrick |
| 5,894,071 A | 4/1999 | Merz et al. |
| 5,904,024 A | 5/1999 | Miwa |
| 5,941,597 A | 8/1999 | Horiuchi et al. |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,059,342 A | 5/2000 | Kawai et al. |
| 6,068,424 A | 5/2000 | Wycech |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Paver, Jr. |
| 6,103,341 A | 8/2000 | Barz et al. |
| 6,103,784 A | 8/2000 | Hilborn et al. |
| 6,131,897 A | 10/2000 | Barz et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,347,799 B1 | 2/2002 | Williams et al. |
| 6,348,513 B1 | 2/2002 | Hilborn et al. |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| 6,435,601 B2 | 8/2002 | Takahara |
| H2047 H | 9/2002 | Harrison et al. |
| 6,444,713 B1 | 9/2002 | Pachl et al. |
| 6,451,231 B1 | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Braz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,550,847 B2 * | 4/2003 | Honda et al. ............. 296/146.6 |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,691,468 B2 | 2/2004 | Helferty |
| 6,708,979 B2 | 3/2004 | Stratman et al. |
| 6,793,274 B2 | 9/2004 | Riley et al. |
| 6,811,864 B2 | 11/2004 | Czaplicki et al. |
| 6,820,923 B1 | 11/2004 | Bock |
| 6,846,559 B2 | 1/2005 | Czaplicki et al. |
| 6,851,232 B1 | 2/2005 | Schwegler |
| 6,855,652 B2 | 2/2005 | Hable et al. |
| 6,880,657 B2 | 4/2005 | Schneider et al. |
| 6,887,914 B2 | 5/2005 | Czaplicki et al. |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,923,499 B2 | 8/2005 | Wieber et al. |
| 6,928,736 B2 | 8/2005 | Czaplicki et al. |
| 6,932,421 B2 | 8/2005 | Barz |
| 6,938,947 B2 | 9/2005 | Barz et al. |
| 6,941,719 B2 | 9/2005 | Busseuil et al. |
| 6,953,219 B2 | 10/2005 | Lutz et al. |
| 6,955,593 B2 | 10/2005 | Lewis et al. |
| 7,025,409 B2 | 4/2006 | Riley et al. |
| 7,114,763 B2 | 10/2006 | Riley et al. |
| 7,141,194 B1 | 11/2006 | Beckmann |
| 7,160,491 B2 | 1/2007 | Barz et al. |
| 2001/0020794 A1 | 9/2001 | Ishikawa |
| 2001/0042353 A1 | 11/2001 | Honda et al. |
| 2002/0033617 A1 | 3/2002 | Blank |
| 2002/0033618 A1 | 3/2002 | Kwon |
| 2002/0053179 A1 | 5/2002 | Wycech |

| | | | | | | |
|---|---|---|---|---|---|---|
| 2002/0054988 A1 | 5/2002 | Wycech | DE | 19858903 A1 | | 6/2000 |
| 2002/0074827 A1 | 6/2002 | Fitzgerald et al. | EP | 0 236 291 | | 9/1987 |
| 2002/0096833 A1 | 7/2002 | Czaplicki et al. | EP | 0 383 498 A2 | | 8/1990 |
| 2002/0174954 A1 | 11/2002 | Busseuil et al. | EP | 0 611 778 A2 | | 8/1994 |
| 2003/0001469 A1 | 1/2003 | Hankins et al. | EP | 0611778 A3 | | 8/1994 |
| 2003/0039792 A1 | 2/2003 | Hable et al. | EP | 0 834 442 A2 | | 4/1998 |
| 2003/0050352 A1 | 3/2003 | Guenther et al. | EP | 0891918 A1 | | 1/1999 |
| 2003/0057737 A1 | 3/2003 | Bock et al. | EP | 0893331 A1 | | 1/1999 |
| 2003/0062739 A1 | 4/2003 | Bock | EP | 0893332 A1 | | 1/1999 |
| 2003/0069335 A1 | 4/2003 | Czaplicki et al. | EP | 1 006 022 A2 | | 6/2000 |
| 2003/0140671 A1 | 7/2003 | Lande et al. | EP | 1 084 816 A2 | | 3/2001 |
| 2003/0176128 A1 | 9/2003 | Czaplicki et al. | EP | 1 134 126 B1 | | 3/2001 |
| 2003/0183317 A1 | 10/2003 | Czaplicki et al. | EP | 1 122 152 A2 | | 8/2001 |
| 2003/0184121 A1 | 10/2003 | Czaplicki et al. | EP | 1 122 156 A2 | | 8/2001 |
| 2003/0201572 A1 | 10/2003 | Coon et al. | EP | 1149679 | | 10/2001 |
| 2003/0209921 A1 | 11/2003 | Coon et al. | EP | 1 031 496 B1 | | 12/2001 |
| 2003/0218019 A1 | 11/2003 | Le Gall et al. | EP | 0893332 B1 | | 3/2002 |
| 2004/0018341 A1 | 1/2004 | Richardson et al. | EP | 1 208 954 A2 | | 5/2002 |
| 2004/0018353 A1 | 1/2004 | Czaplicki et al. | EP | 1 256 512 A2 | | 11/2002 |
| 2004/0034982 A1 | 2/2004 | Wieber et al. | EP | 1 006 022 B1 | | 9/2003 |
| 2004/0036317 A1 | 2/2004 | Kleino | EP | 1 359 004 | | 11/2003 |
| 2004/0046423 A1 | 3/2004 | Wieber | EP | 1 362 683 A2 | | 11/2003 |
| 2004/0056472 A1 | 3/2004 | Schneider | EP | 1 362 769 A1 | | 11/2003 |
| 2004/0076831 A1 | 4/2004 | Hable et al. | EP | 1 475 295 A2 | | 11/2004 |
| 2004/0084141 A1 | 5/2004 | Czaplicki | EP | 1 591 224 A1 | | 2/2005 |
| 2004/0112531 A1 | 6/2004 | Bogert et al. | EP | 1 157 916 B1 | | 10/2005 |
| 2004/0124553 A1 | 7/2004 | Czaplicki et al. | FR | 2 749 263 | | 12/1997 |
| 2004/0143969 A1 | 7/2004 | Czaplicki et al. | GB | 2 083 162 A | | 5/1982 |
| 2004/0212220 A1 | 10/2004 | Riley et al. | GB | 2 375 328 A | | 11/2002 |
| 2004/0217626 A1 | 11/2004 | Barz et al. | JP | 4-300716 | | 10/1992 |
| 2004/0227377 A1 | 11/2004 | Gray | JP | 10-53156 | | 2/1998 |
| 2004/0256888 A1 | 12/2004 | Le Gall et al. | JP | 2001-48055 | | 2/2001 |
| 2004/0262810 A1 | 12/2004 | Barz et al. | JP | 02001191949 A | | 7/2001 |
| 2004/0262853 A1 | 12/2004 | Larsen et al. | JP | 2002012167 | | 1/2002 |
| 2005/0012280 A1 | 1/2005 | Richardson | WO | WO89/06595 | | 7/1989 |
| 2005/0016807 A1 | 1/2005 | Braymand | WO | WO95/32110 | | 11/1995 |
| 2005/0017543 A1 | 1/2005 | Riley et al. | WO | WO97/02967 | | 1/1997 |
| 2005/0081383 A1 | 4/2005 | Kosal et al. | WO | WO97/43501 | | 11/1997 |
| 2005/0082111 A1 | 4/2005 | Weber | WO | WO98/36944 | | 8/1998 |
| 2005/0087899 A1 | 4/2005 | Coon et al. | WO | WO98/50221 | | 11/1998 |
| 2005/0102815 A1 | 5/2005 | Larsen | WO | WO99/08854 | | 2/1999 |
| 2005/0126286 A1 | 6/2005 | Hable et al. | WO | WO99/28575 | | 6/1999 |
| 2005/0127145 A1 | 6/2005 | Czaplicki et al. | WO | WO99/48746 | | 9/1999 |
| 2005/0159531 A1 | 7/2005 | Ferng | WO | WO99/50057 | | 10/1999 |
| 2005/0166532 A1 | 8/2005 | Barz | WO | WO 99/61280 | | 12/1999 |
| 2005/0172486 A1 | 8/2005 | Carlson et al. | WO | WO 99/61289 | | 12/1999 |
| 2005/0194706 A1 | 9/2005 | Kosal et al. | WO | WO00/03894 | | 1/2000 |
| 2005/0212326 A1 | 9/2005 | Marion | WO | WO00/12574 | | 3/2000 |
| 2005/0212332 A1 | 9/2005 | Sheldon et al. | WO | WO00/12595 | | 3/2000 |
| 2005/0217785 A1 | 10/2005 | Hable et al. | WO | WO00/13876 | | 3/2000 |
| 2005/0218697 A1 | 10/2005 | Barz et al. | WO | WO00/13958 | | 3/2000 |
| 2005/0230165 A1 | 10/2005 | Thomas et al. | WO | WO00/20483 | | 4/2000 |
| 2005/0241756 A1 | 11/2005 | Harthcock et al. | WO | WO00/27920 | | 5/2000 |
| 2005/0249916 A1 | 11/2005 | Muto et al. | WO | WO00/37302 | | 6/2000 |
| 2005/0249936 A1 | 11/2005 | Ui et al. | WO | WO00/37554 | | 6/2000 |
| 2005/0251988 A1 | 11/2005 | Mendiboure | WO | WO00/39232 | | 7/2000 |
| 2005/0260399 A1 | 11/2005 | Finerman | WO | WO00/40629 | | 7/2000 |
| 2005/0268454 A1 | 12/2005 | White | WO | WO00/40815 | | 7/2000 |
| 2005/0269840 A1 | 12/2005 | Finerman et al. | WO | WO00/43254 | | 7/2000 |
| 2005/0276970 A1 | 12/2005 | Busseuil et al. | WO | WO00/52086 | | 9/2000 |
| 2005/0279567 A1 | 12/2005 | Ito | WO | WO00/55444 | | 9/2000 |
| 2005/0285292 A1 | 12/2005 | Mendiboure et al. | WO | WO01/19667 | | 3/2001 |
| 2006/0000186 A1 | 1/2006 | Carlson et al. | WO | WO00/46461 | | 8/2001 |
| 2006/0006695 A1 | 1/2006 | Lutz et al. | WO | WO01/54936 | | 8/2001 |
| 2006/0008615 A1 | 1/2006 | Muteau et al. | WO | WO01/56845 | | 8/2001 |
| 2006/0019595 A1 | 1/2006 | Lewis et al. | WO | WO 0158741 A1 | * | 8/2001 |
| 2006/0020076 A1 | 1/2006 | Finerman et al. | WO | WO01/71225 | | 9/2001 |
| 2006/0021697 A1 | 2/2006 | Riley et al. | WO | WO01/83206 | | 11/2001 |
| | | | WO | WO 01/88033 | | 11/2001 |
| | FOREIGN PATENT DOCUMENTS | | WO | WO 02/055923 A2 | | 7/2002 |
| | | | WO | WO 03/042024 A1 | | 5/2003 |
| DE | 19812288 C1 | 5/1999 | WO | WO 03/047951 A1 | | 6/2003 |
| DE | 19856255 C1 | 1/2000 | WO | WO03/061934 | | 7/2003 |

| WO | WO 03/089221 A1 | 10/2003 |
| --- | --- | --- |
| WO | WO 03/093387 | 11/2003 |
| WO | WO2004/113153 | 12/2004 |
| WO | WO2005/044630 | 5/2005 |
| WO | WO 2005/077634 | 8/2005 |
| WO | WO2005/080524 | 9/2005 |
| WO | WO 2005/105405 | 11/2005 |
| WO | WO 2005/113689 | 12/2005 |

OTHER PUBLICATIONS

Copending U.S. Appl. No. 09/502,686, filed Feb. 11, 2000.
Copending U.S. Appl. No. 09/524,961, filed Mar. 14, 2000.
Copending U.S. Appl. No. 09/631,211, filed Aug. 3, 2000.
Copending U.S. Appl. No. 09/858,939, filed May 16, 2001.
Copending U.S. Appl. No. 09/655,965, filed Sep. 6, 2000.
Copending U.S. Appl. No. 09/676,335, filed Sep. 29, 2000.
Copending U.S. Appl. No. 09/676,725, filed Sep. 29, 2000.
Copending U.S. Appl. No. 09/859,126, filed May 16, 2001.
Copending U.S. Appl. No. 10/163,894, filed Jun. 4, 2002.
Copending U.S. Appl. No. 09/906,289, filed Jul. 16, 2001.
Copending U.S. Appl. No. 09/939,152, filed Aug. 24, 2001.
Copending U.S. Appl. No. 60/317,009, filed Sep. 4, 2001.
Copending U.S. Appl. No. 60/318,183, filed Sep. 7, 2001.
Copending U.S. Appl. No. 09/974,017, filed Oct. 10, 2001.
Copending U.S. Appl. No. 60/324,497, filed Sep. 24, 2001.
Copending U.S. Appl. No. 09/982,681, filed Oct. 18, 2001.
Copending U.S. Appl. No. 10/008,505, filed Nov. 8, 2001, which claims priority from European Application No. 0106911.1 filed Mar. 20, 2001.
Search Report dated Sep. 5, 2001.
Search Report dated Sep. 2, 2002.
Written Opinion dated Apr. 22, 2003.
Copending U.S. Appl. No. 10/233,919, filed Sep. 3, 2002.
European Application Serial No. 0106911.1 filed Mar. 20, 2001.
International Preliminary Examination Report dated Sep. 8, 2003 for Application Serial No. PCT/EP02/05224.
Hopton et al., Application of Structural Reinforcing Material to Improve Vehicle NVH Characteristics, Sep. 1999.
Lilley et al., Comparison of Preformed Acoustic Baffles and Two-Component Polyurethane Foams for Filling Body Cavities, Apr. 2001.
Lilley et al., A Comparison of NVH Treatments for Vehicle Floorplan Applications, Apr. 2001.
Lilley et al., Vehicle Acoustic Solutions, May 2003.
Mansour et al., Optimal Bonding Thickness for Vehicle Stiffness, Apr. 2001.
Search results on http://ep.espacenet.com for all foreign counterpart applications to U.S. Patent No. 6,550,847, Jul. 31, 2009.

* cited by examiner

STRUCTURAL REINFORCEMENT

This application is a continuation of U.S. application Ser. No. 10/008,194 filed on Nov. 8, 2001, now U.S. Pat. No. 6,941,719, which claims priority from Great Britain application number 0111151.7 filed May 8, 2001. This application claims the benefit of the filing dates of both the aforementioned applications, U.S. application Ser. No. 10/008,194 and Great Britain application number 0111151.7.

FIELD OF THE INVENTION

The present invention relates to reinforcing materials and in particular to reinforcing materials that can be provided in hollow cross-sectional members particularly to provide reinforcement to improve the structural integrity of vehicles or other articles.

BACKGROUND OF THE INVENTION

The trends in motor vehicle design are towards lighter vehicles to improve fuel consumption. At the same time, auto manufacturers continue to demand more rigorous structural performance standards. The use of lighter materials such as aluminum to produce the hollow cross-sectional members that are used as vehicle sub frames has lead to the desire for additional reinforcement. There is a need for reinforcement in various locations in the vehicle structure including the sub frame and upper structure, the form of reinforcement required can vary from one location in the vehicle to another and from vehicle to vehicle. The present invention therefore improves the strength of vehicles structures made from existing materials and enables vehicle structures based on lighter materials to contribute to safety requirements.

There are five main types of applications where structural reinforcement is desired in vehicles. In one, control over vehicle body deformation is attractive for assisting in accident management. In another, it is desirable for increased energy absorption to enhance performance after yield of a structure. The reduction of mechanical constraints such as compression, shear torsion and flexing, or body movement in the vehicle structure particularly to improve durability and reduce stress effects and point mobility issues requiring the reduction of resonance by the provision of stiffening. The need for reinforcement is present irrespective of the materials that are used to produce the vehicle structure and the need varies from material to material and according to the nature of the reinforcement that is being provided. The reinforcing parts can also reduce the noise created by the motion of a vehicle by providing a sound deadening effect as a result of blocking air paths in cavities.

It is known to provide foamable plastic mouldings within hollow cross sections of vehicles which can be foamed upon application of heat, such as is provided by the curing step in an electrocoat process, to provide a foamed baffle that fills the cross-section to provide sound adsorption. Such systems are described in European patent applications 0383498 and 0611778. The foam baffle provides sound deadening and vibration resistance. In these systems the entire insert is foamable and it is proposed that the foamable material be chosen so that it will foam during the curing process, which follows the electrocoat process typically used in vehicle manufacture to provide resistance to metal corrosion. The materials of these patents are not however reinforcing materials but are used to provide acoustic baffles and seals.

In the electrocoat process a vehicle structure is immersed in a bath of coating fluid from which an anticorrosion coating is deposited on the metal by electrolysis. The vehicle metal structure is subsequently heated to bake the coating on the metal. The electrocoat process is typically applied to complete vehicle structures in which hollow sections have been capped. Accordingly reinforcing structures are preferably provided within hollow sections prior to the electrocoat. It is therefore important that the reinforcing structure have minimal impact on the operation and efficiency of the electrocoat process.

Where reinforcing materials have been provided they have either been stuck to the metal structure prior to subjecting the vehicle structure to the electrocoat process or have been provided after the electrocoat process. The former technique has the problem that it is not possible to perform the electrocoat over the entire surface, which can lead to local areas of corrosion. The latter technique is cumbersome and requires the provision of fastening means after electrocoating, which can damage the electrocoat and again lead to local areas of corrosion.

It is also known to provide structural reinforcement inside the structural members of automobile frames by the provision of metallic or plastic reinforcing members that are bonded to the inner surface of the structural member by means of a structural foam. For example, PCT Publications WO 99/61280 and WO 97/43501 disclose metallic reinforcing members bonded to the internal surface of an automobile structural member by a structural foam and our co-pending UK Application 0106911.1 and U.S. application Ser. Nos. 09/676,335 and 09/502,686 disclose moulded plastic, particularly glass reinforced nylon mouldings bonded to the internal surface of an automobile structure by a structural foam.

In the production of these reinforced structural members the metallic or moulded member is coated with an expandable adhesive material. The expandable adhesive material being such that it will expand at temperatures to which the automobile is exposed during manufacture such as in the curing stage of the electrocoat process or in the paint oven. The reinforcing member is therefore placed within the cavity of the vehicle with the coating of the expandable adhesive material being in an unfoamed state. During the automobile manufacture the expandable adhesive material will be brought to its expansion temperature and will expand to fill the gap between the inner surface of the vehicle structural member and the reinforcing member to bond the reinforcing member to the inner surface of the vehicle structural member. In this way a light and strong structural reinforcement is provided.

Despite these techniques there is a continuing need to provide greater reinforcement and at the same time provide lighter weight vehicles, which in turn requires lighter weight reinforcing members. Accordingly, there is a need to reduce the weight and thus the amount of material used in the reinforcing members. Furthermore, there is an economic need to reduce the amount of expandable adhesive material that is used, consistent with achieving the desired degree of reinforcement.

The present invention is aimed at providing such improved structural reinforcement systems.

The present invention therefore provides a structural reinforcing member for reinforcing a hollow structural member comprising a reinforcing member having on the surface thereof an expandable adhesive material wherein the surface of the reinforcing member is provided with one or more extensions which approach the internal surface of the hollow structural member when placed within the hollow structural member wherein the expandable adhesive material is located against at least one of said extensions so that the extensions guide the expansion of the expandable adhesive material.

The provision of the extensions on the mouldings according to the present invention can serve a dual function. Some or all of the extensions can provide local areas of the reinforcing member (potentially of increased section thickness relative to adjoining sections) which when in place are closer to the inner surface of the hollow structural member than the remaining bulk of the reinforcing member. In this way the extensions may be located and designed to help reduce deformation of the hollow structural member on impact. At least one of the extensions also locally directs the expansion of the expandable adhesive material to ensure that there is adhesion between the reinforcing member and the internal surface of the structural member where adhesion is required. This in turn enables selective use of the expandable adhesive material and can obviate the need to coat the entire surfaces of the reinforcing member that face the internal surfaces of the hollow structural member with the expandable adhesive material. It may also be possible to achieve localized sections of increased density of the expandable adhesive material, upon expansion.

The dimensions of the rigid reinforcing member and the thickness and nature of the expandable adhesive material are important to the achievement of the desired structural reinforcement. The exterior profile shape of the reinforcing member should conform substantially to the cross section of the hollow structural member it is designed to reinforce. The shape may vary along the length of the reinforcing member as the dimensions of the cross section of the hollow structural member change. The size of the reinforcing member including the expandable adhesive material should be such that there is a small clearance between the extremity of the reinforcing member and the interior walls of the hollow structural member to allow for passage of any coating, such as an electrocoat fluid. Preferably, the reinforcing member has a cellular, honeycomb or ribbed internal structure to provide reinforcement along several different axes at minimum weight.

The extensions that are provided on the external surface of the structural reinforcing member may be ribs, raised embossments or they may be part of a stamped area. The extensions may be integral with a moulding if the parts are produced by injection moulding or may be stamped or otherwise formed on metal reinforcing members. Alternatively, the extensions may be attached subsequent to the formation of the reinforcing member. The positioning of the extensions on the external surface of the reinforcing member will be determined by the shape of the member and the position in which it is to be placed within the hollow structural member which may be determined by the nature of the impact deformation that the reinforcing member is required to resist.

In a preferred embodiment the structural reinforcing member is also provided with small lugs, which enable it to stand away from the interior walls of the hollow structural member. In this way fastening devices are not required and the area of contact between the structural reinforcing member and the interior walls of the hollow structural member can be minimised. In this preferred embodiment the clearance between the extremity of the foamable adhesive material on the reinforcing member and the interior walls of the structural member can be determined to be wide enough to enable the liquid used in the electrocoat bath to flow between the reinforcing member and the interior walls of the hollow structural member in sufficient quantity to enable an effective anti-corrosion or other coating to be deposited. On the other hand, the clearance can be determined so as not be too wide so as to not benefit from the advantages of the invention, when the expandable adhesive has expanded to fill the clearance and bond the structural reinforcing member to the interior walls of the structural member. Preferably, the clearance is no more than about 1 centimeter and is more preferably about 2 to 10 millimeters, and still more preferably about 3 to 7 millimeters. In one embodiment, a substantially uniform clearance around the whole structure enables a more uniform foam structure to be obtained.

The rigid reinforcing member may be made from any suitable material, for example it may be made of metal or plastic and the material will be chosen according to the preferred fabrication method. The plastic may be thermoplastic or thermosetting. This in turn is driven by economics and the complexity of the cross section to be reinforced. Reinforcing members for simple cross sections may be prepared by extrusion whilst injection moulding may be required for more complex structures. Metal members may be produced by stamping and/or forming. Where extrusion is used the members may be of metal or thermoplastics; where injection moulding is used thermoplastics are preferred, where compression moulding is used thermoplastic or thermosetting material may be used. Polyamides, particularly glass filled or carbon fibre filled polyamides are suitable materials particularly for injection mouldings due to their high strength to weight ratio. Alternatively injection moulding or die casting of metal alloys may be employed. Foamed metals are also possible. It is preferred that the moulding is provided with means enabling fluid drainage. For example, holes or channels may be provided in the moulding to allow the drainage of water, which may condense in the structure over time.

As discussed herein, the present invention finds suitable application in a number of different environments. The invention is particularly useful for the provision of reinforcement in automotive vehicles, particularly to help provide energy distribution control in response to a force. The preferred shape and structure of the reinforcing member will depend upon where it is to be located in the vehicle structure and the function it is to perform. For example, if it is to be located in the front longitudinal section of the vehicle it might be designed for impact resistance. On the other hand, it may be designed to reduce point mobility such as for example at the base of side and rear pillars in the vehicle. The reduction of point mobility is particularly important with high-sided vehicles where the reinforcement can help reduce or prevent vehicle sway thus potentially reducing metal fatigue. Other applications include the resistance of deformation of the rear longitudinal section, in particular to prevent upward deformation from rear impact. Other parts of a vehicle which may be reinforced by the techniques of the present invention include roof structures, pillars, frame cross members such as the engine cradle and window frames particularly rear window frames.

The expandable adhesive material serves two main functions, it will expand to fill the space between the reinforcing member and the interior of the hollow member and it will also bond to the interior wall of the hollow member. Accordingly, expandable adhesive material means that the material can be activated to both expand (typically foam) and to act as an adhesive, at the conditions, e.g., temperature, at which it expands. Activation therefore enables the expandable material to expand and fill a gap between the reinforcing member and the hollow structural member it is designed to reinforce and to bond to the internal surface of the hollow structure. Accordingly the expandable adhesive expands at the desired temperature and is sufficiently adhesive to firmly bond the reinforcing member to the interior surface of the hollow structural member.

While it is not essential, it is preferred that prior to activation the expandable adhesive material is dry and not tacky to the touch. This facilitates shipping and handling of the structural reinforcing member and helps prevent contamination. Examples of preferred expandable adhesive materials include foamable epoxy-base resins and examples of such materials are the products L5206, L5207, L5208 and L5209, which are commercially available from L & L Products of Romeo Mich. USA, and the Betacore Products BC 5204, 5206, 5207, 5208 and 5214 available from Core Products, Strasbourg, France. The expandable adhesive material should be chosen according to the rate of expansion and foam densities required. It is further preferred that it expand at the temperatures experienced in a coating bake oven, such as an electrocoat process oven, typically 130° C.-200° C. Alternatively the material may be expanded by infrared high frequency, moisture, microwave or induction heating which are particularly useful in systems which do not employ the electrocoat process.

The expandable material is applied to the surface of the reinforcing member at a location where its direction of expansion is controlled by at least one of the extensions formed on the surface of the reinforcing member. In a preferred embodiment the reinforcing member is provided with two or more ribs and the expandable material is provided between the ribs. In this way the reinforcing member may be located within the hollow structural member so that the extremities of the ribs are close to the inner surface of the hollow structural member, thereby helping to increase the resistance to deformation of the hollow structural member. At the same time at least one of the ribs directs the expansion of the expandable adhesive material through the channel formed between the ribs towards the inner surface of the hollow structural member. In this way an effective bond between the rigid reinforcing member and the hollow structural member may be achieved with a reduced amount of expandable adhesive material.

In an alternative embodiment a series of pairs of ribs may be provided along one or more of the surfaces of the reinforcing member and the expandable material may be located between the ribs of one or more pairs. In this way upon expansion bonds may be formed between the reinforcing member and the inner surface of the hollow structural member at different positions along the length and/or width of the reinforcing member. The number of bond points and their location will depend on the size and shape of the reinforcing member and the forces which it is designed to withstand.

In yet a further embodiment a single extension may be provided and the expandable material located close to the single extension so that its expansion in one direction is controlled by the extension. In this embodiment the size and shape of the cavity between the hollow structural member and the reinforcing member may be such that it controls the expansion of the expandable adhesive material in another direction.

The expandable material should be applied to at least a portion of the surface of the rigid reinforcing member that will be adjacent to an interior surface of the hollow structure that is to be reinforced. This optimum location of the expandable adhesive will depend upon the shape of the hollow structure to be reinforced but it is preferably present so that it provides adhesion to two non-parallel surfaces to give rigidity in at least two dimensions. It is preferred that the expandable adhesive material be applied over at least part of each of the top and bottom and the sides of the reinforcing member. In this way when the material expands it can expand into the gap around the entire surface of the reinforcing member that is adjacent to the interior walls of the hollow structure. The expandable adhesive material may be applied to the rigid reinforcing member by bonding a strip of the material to the member, by for example extrusion coating or by injection moulding. Where the reinforcing member is made by injection moulding the expandable adhesive material may be applied by over-moulding or two shot injection moulding. The material should however be applied under conditions such that substantially no expansion takes place during application. It is also possible to place the reinforcing member in the structural member to be reinforced and to pump liquid expandable material around it.

It is preferred that the reinforcing member coated with the expandable adhesive material is located within the hollow structural member that it is designed to reinforce in a manner that provides a clearance between the external surface of the coated member and the internal surface of the hollow structural member. This allows for the passage of a coating fluid, such as electrocoat fluid, between the hollow structural member and the internal surface and also enables a uniform expansion of the foam around the member to provide more uniform reinforcement.

Accordingly in a preferred process for providing reinforcement within a hollow structural member such as a vehicle frame, moulded reinforcing members provided with extensions and with a layer of expandable material thereon adjacent to extensions are installed during assembly of the vehicle frame. Locating lugs are preferably moulded into the reinforcing member or the expandable material so that the reinforcing member sits within the hollow structural member leaving a space between the member and the interior walls of the hollow structural member to be reinforced. In this way, it is possible to avoid any need for fastening or bonding means to attach the member to the interior walls of the hollow structural member. The assembled structure may then be coated. For instance, the assembled structure may then be subjected to the electrocoat process in which it is passed through a bath of coating material and a corrosion resistant coating is deposited onto the structure by electrolysis. The vehicle structure is then dried in an oven to cure the coating. The expandable material is preferably chosen so that it is activated to expand and develop adhesive properties by the conditions used in the oven employed to cure the coating. The expandable material will therefore expand under the curing conditions to provide both a foam that fills the space between the member and the interior walls of the hollow structural member and a strong bond between the reinforcing member and the interior wall of the hollow structural member. Typically the coated structure is cured at around 80 to 200° C. (e.g., 165° C.) for about 5 to 40 minutes (e.g., above 20 minutes) and accordingly the expandable adhesive material should be activated under these conditions. The automobile industry is however looking to use lower curing temperatures and shorter drying times and this may influence the choice of expandable materials.

If other components, for example bolts or other fasteners, are to pass through the reinforcing members during subsequent assembly, it may be necessary to take care to ensure that holes formed in the reinforcing member for the passage of the bolts are not blocked by the expansion of the expandable material.

The techniques of the present invention may be used for the reinforcement of any construction that is based on a hollow frame structure. They may for instance be used in the construction industry, in boats, in aircraft, and in railroad applications. The techniques are however particularly useful to provide reinforcement in automobiles including cars, trucks, buses, caravans and the like. The techniques are particularly useful in the current trend towards using lighter and sometimes weaker materials in the production of automobile sub frames where there is a greater need for reinforcement to compensate for the reduction in strength of the basic material and contribute to satisfy the safety requirements. This is particularly the case with the use of aluminum for the production of hollow sub frames of automobiles. Another application of the present invention is in the reinforcement of furniture (e.g., seating, cabinets, shelving, or the like), household or industrial applicances (e.g., a frame of a refrigerator, oven, dishwasher, laundry machine or the like), and storage containers.

BRIEF DESCRIPTION OF DRAWINGS

The present invention is illustrated by reference to the accompanying drawings in which FIG. 1A shows the system prior to activation of the expandable adhesive material and FIG. 2A shows the system after activation.

FIG. 3A shows the system prior to activation of the expandable adhesive material and FIG. 4A shows the system after activation.

FIG. 1B shows the system prior to activation of the expandable adhesive material and FIG. 2B shows the system after activation.

FIG. 3B shows the system prior to activation of the expandable adhesive material and FIG. 4B shows the system after activation.

DETAILED DESCRIPTION OF THE PREFERRED EMBODIMENT

Figure 1A:
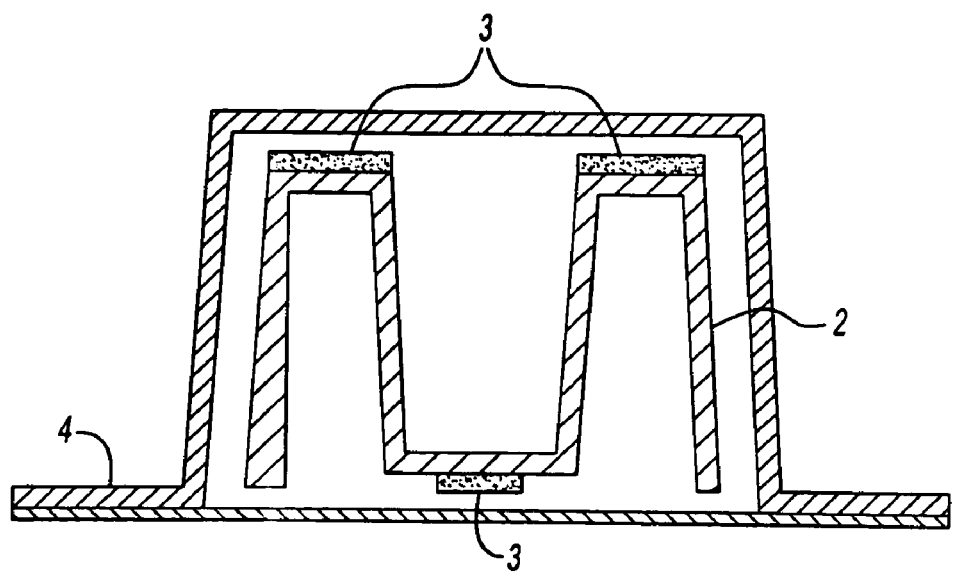
FIGS. 1A and 2A illustrate a reinforcement according to the prior art.
Figure 2A:
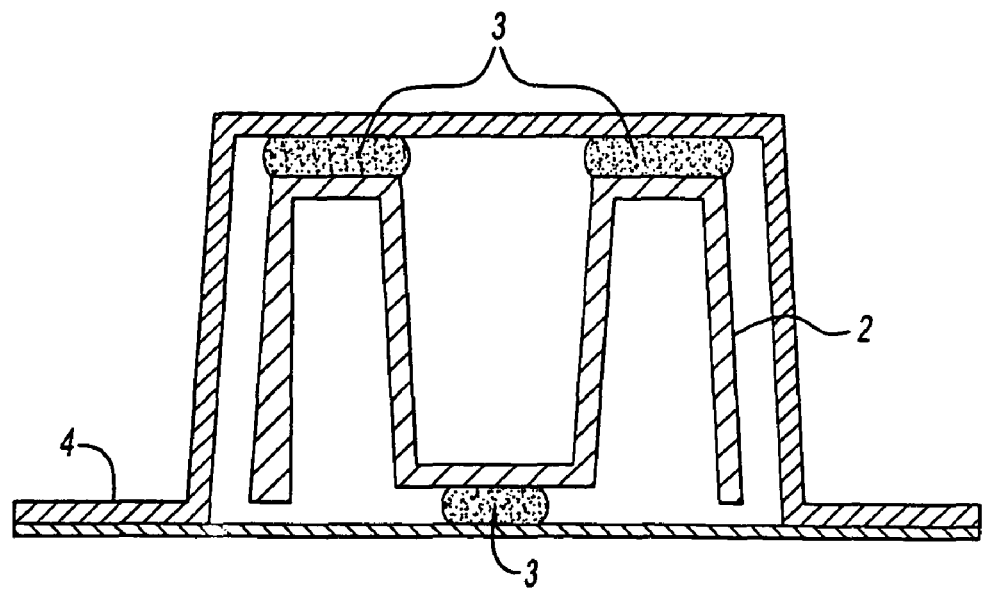

FIG. 1A shows a cross section of a hollow structural member (e.g., for a vehicle) 4 in which is positioned a reinforcing member 2 with an 'M' shaped cross section. An expandable adhesive material 3 is provided on the surface of the reinforcing member 2 adjacent the inner surface of the structural member 4. FIG. 2A shows the same cross section as FIG. 1A but after expansion of the expandable adhesive 3 as may be accomplished by the curing step in the electrocoat process. FIG. 2A shows how the adhesive 3 expands between the reinforcing member 2 and the structural member 4 to provide a foam which bonds the reinforcing member and the structural member together.

Figure 3A:
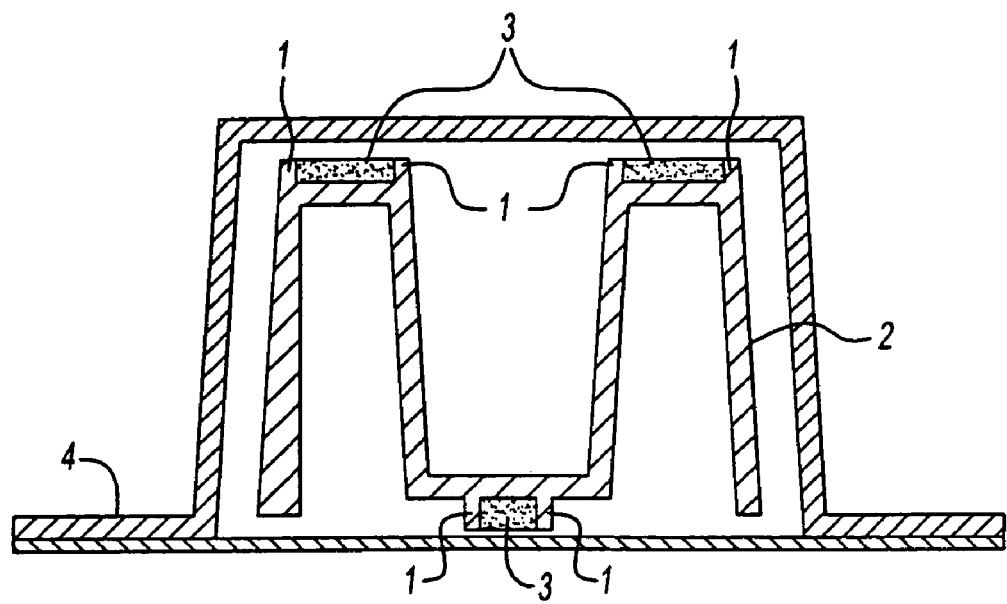
FIGS. 3A and 4A illustrate a reinforcement according to the present invention.
Figure 4A:
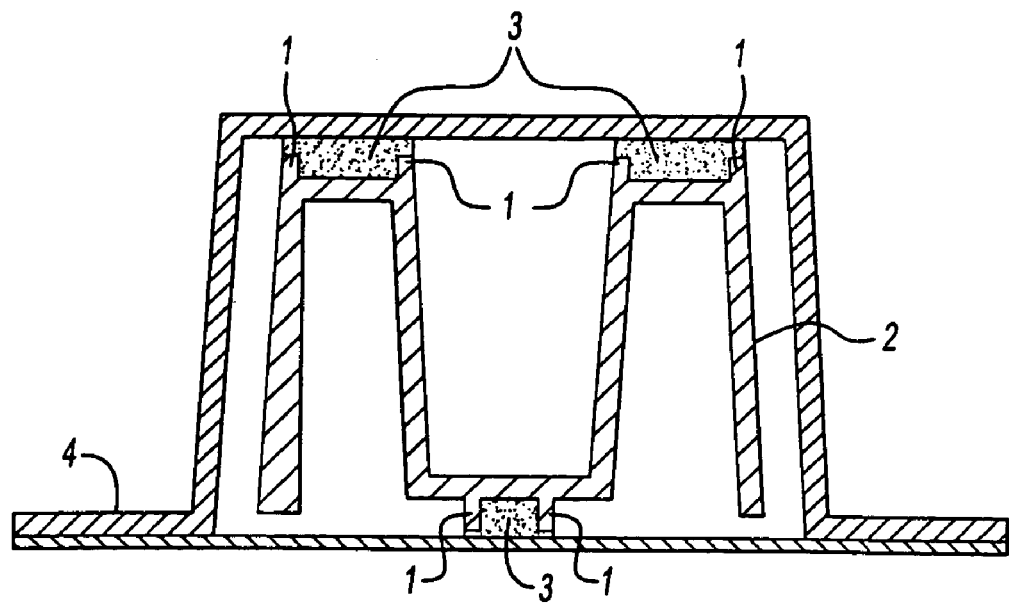
Figure 5A:
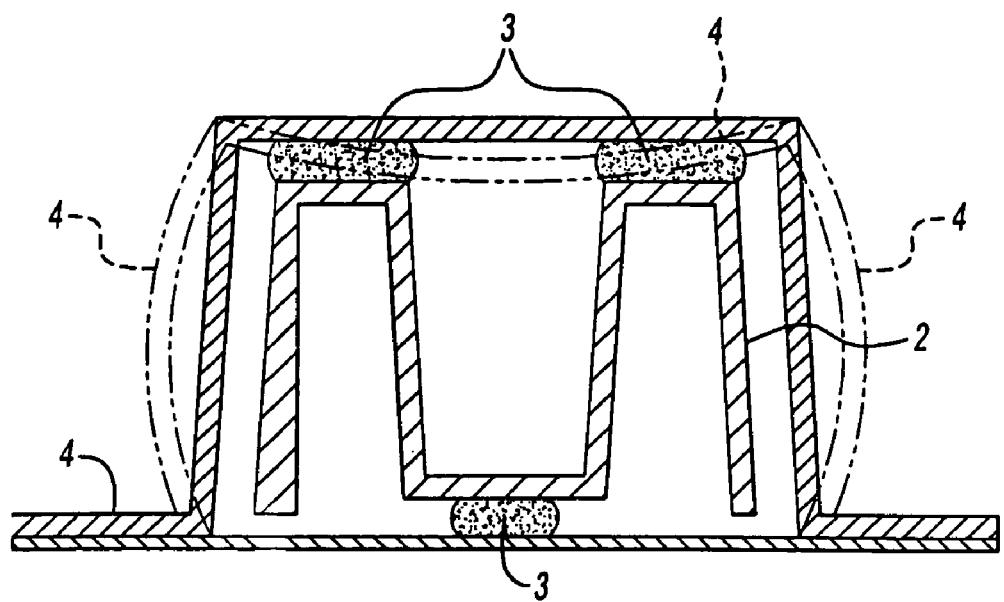
FIG. 5A illustrates the potential deformation of the reinforcing system of FIG. 2A when subject to a force in the direction showing by arrow 'A' and FIG. 5B illustrates the potential deformation of the system of FIG. 4A when subjected to the same force.
Figure 5B:
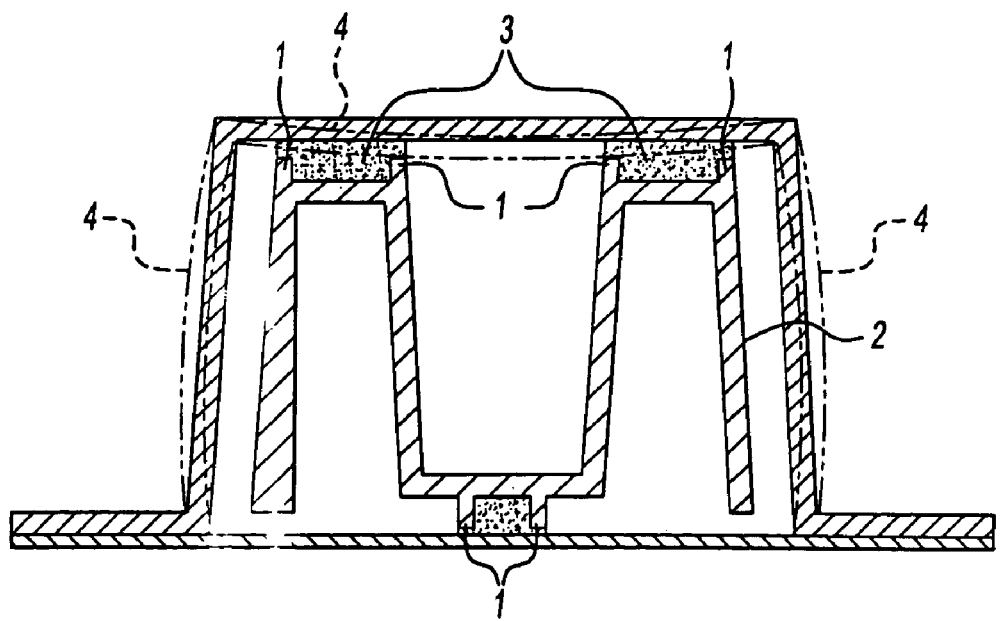

FIG. 3A shows the same cross section of the hollow vehicle structural member 4 containing an 'M' shaped reinforcing member 2. In this instance the reinforcing member is provided with a pair of ribs 1 at the three positions where the expandable adhesive is provided. These pairs of ribs form grooves which contain the expandable adhesive 3. FIG. 4A shows how the expansion of the expandable adhesive is controlled by the ribs 1 to enable adequate adhesion between the structural member 2 and the reinforcing member 4 with a smaller amount of expandable adhesive than that required in the system of FIG. 1A. Comparison of FIGS. 5A and 5B show how the provision of the ribs 1 on the reinforcing member 2 (as in FIG. 5B) reduces the deformation of the reinforced structure when compared to the deformation of the system without the ribs of this invention which is shown in FIG. 5A.

Figure 1B:
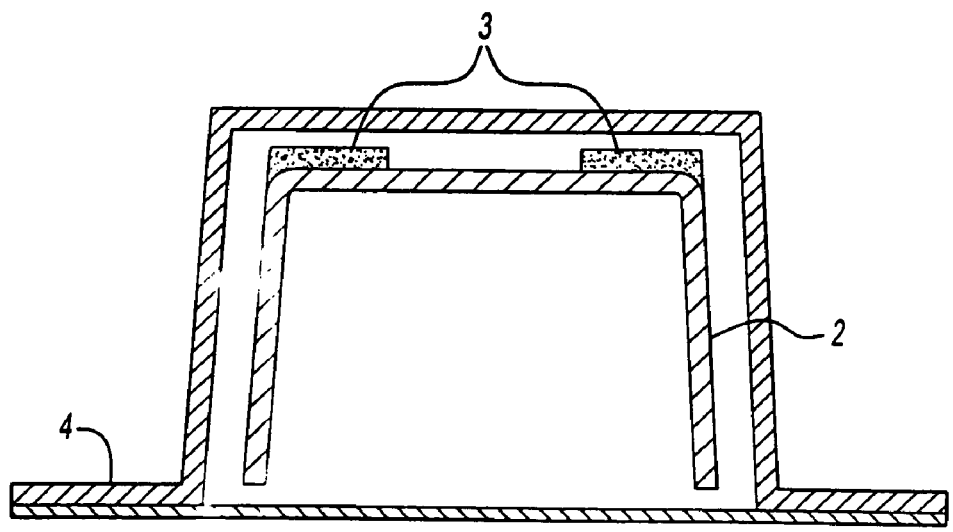
FIGS. 1B and 2B illustrate another form of a conventional reinforcement.
Figure 2B:
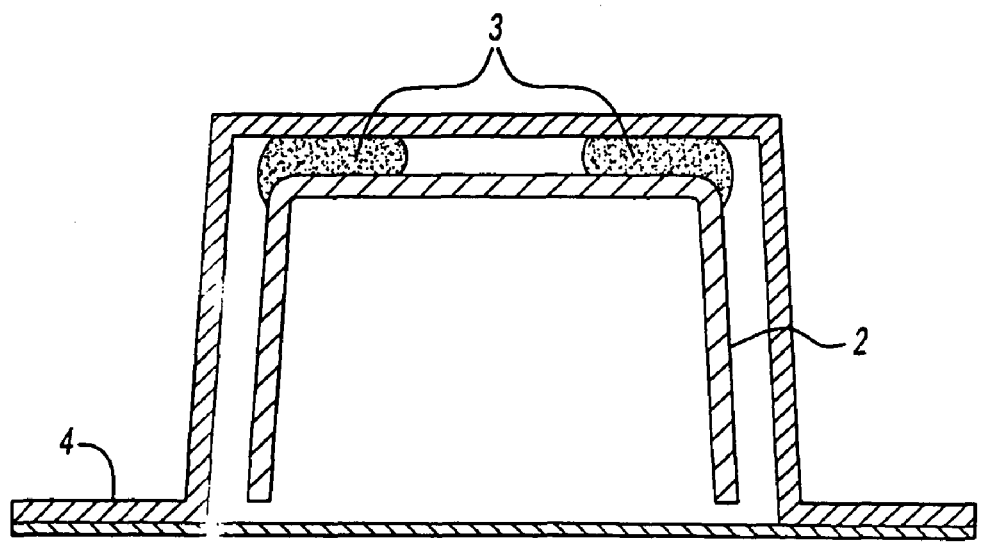

FIGS. 1B and 2B show an automobile structural member 4 of similar cross section to that in the previous figures. In this instance the structural member contains a 'U' shaped reinforcing member 2. In FIG. 1B the structural reinforcing member 2 is provided with expandable adhesive 3 at the corners of the 'U' shape. FIG. 2B shows how the expandable adhesive can expand across the cavity between the structural member 4 and the reinforcing member 2 in order to bond the two together.

Figure 3B:
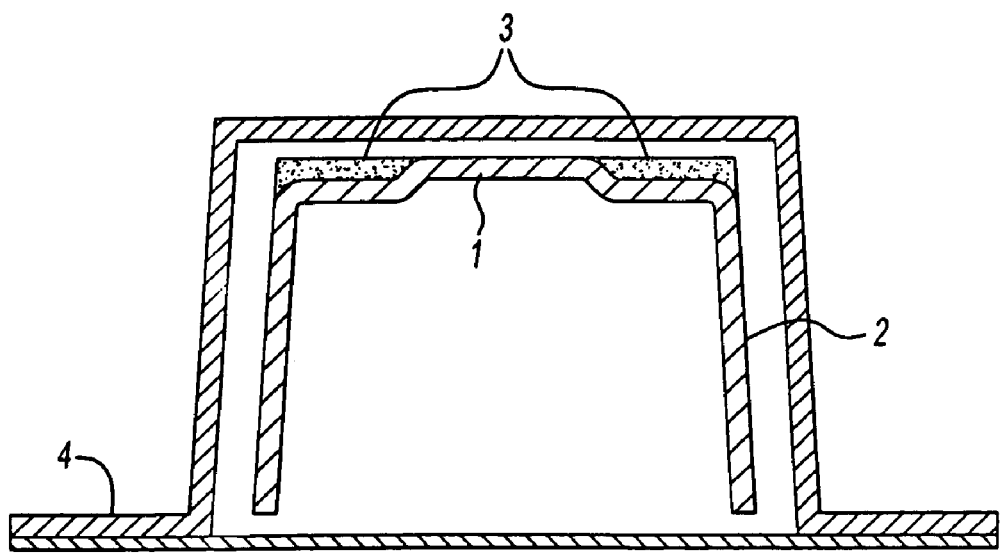
FIGS. 3B and 4B illustrate a reinforcement according to the present invention.
Figure 4B:
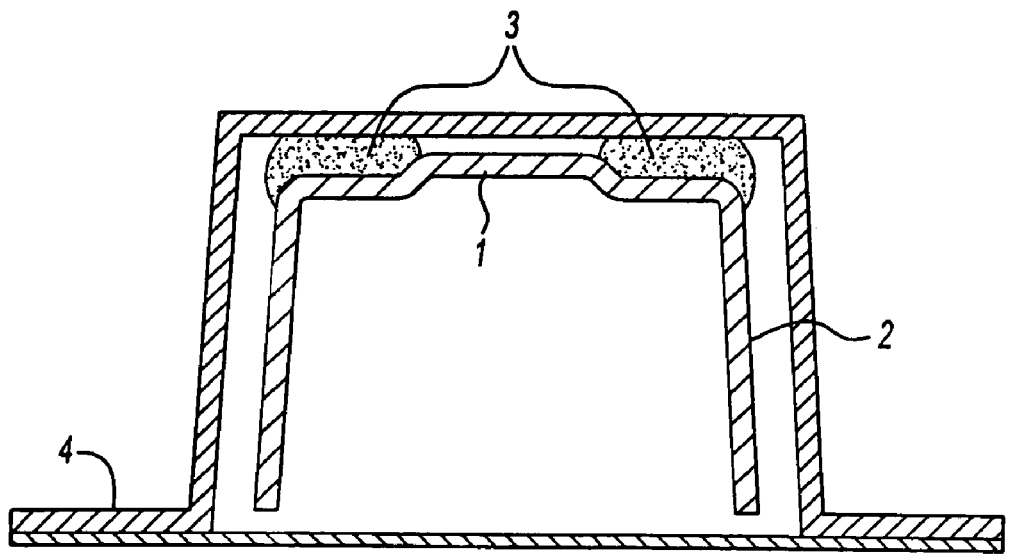

FIG. 3B shows a system of the present invention in which a longitudinal protrusion 1 is formed in the base of the 'U' shaped member 2 and the expandable adhesive is provided to abut up against the protrusion 1. FIG. 4B shows the system of FIG. 3B after expansion of the expandable adhesive.

Figure 6A:
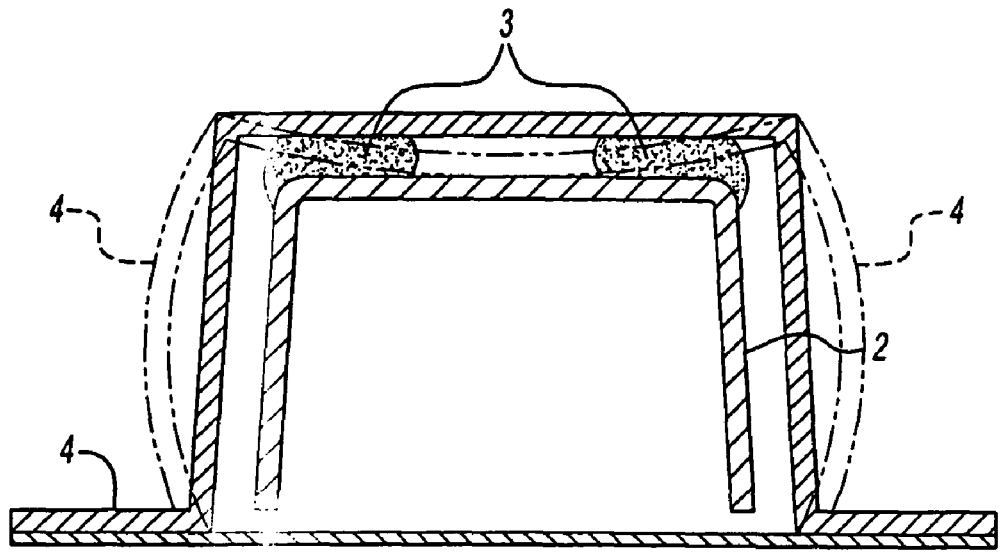
FIG. 6A illustrates the potential deformation of the reinforcing system of FIG. 2B when subject to a force in the direction shown by arrow 'A' and FIG. 6B illustrates the potential deformation of the reinforcing system of FIG. 4B when subjected to the same force.
Figure 6B:
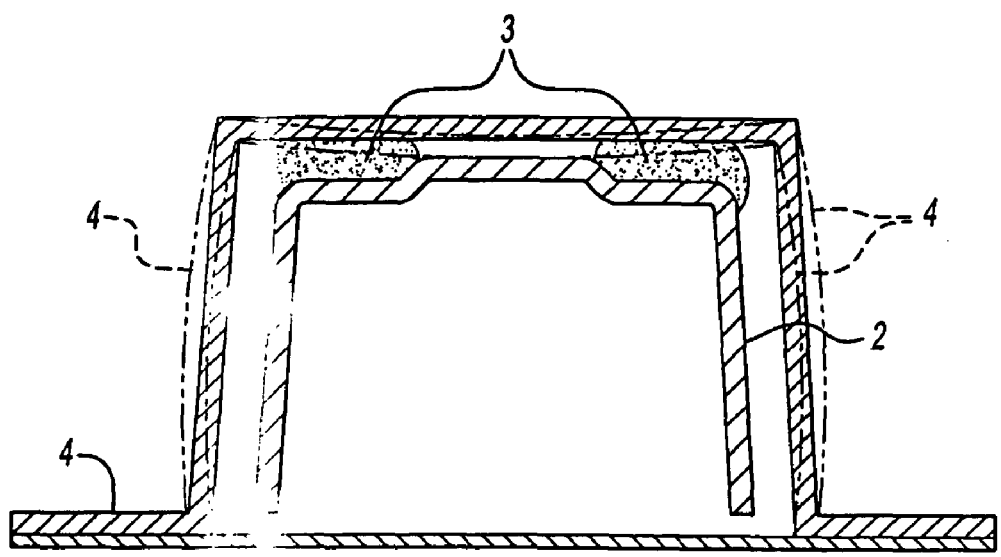

FIGS. 6A and 6B, show the deformation of the structural member 4 which occurs when the systems illustrated in FIG. 2B and FIG. 4B respectively are subjected to the same compression strength in the direction of the arrow A.

Figure 7:
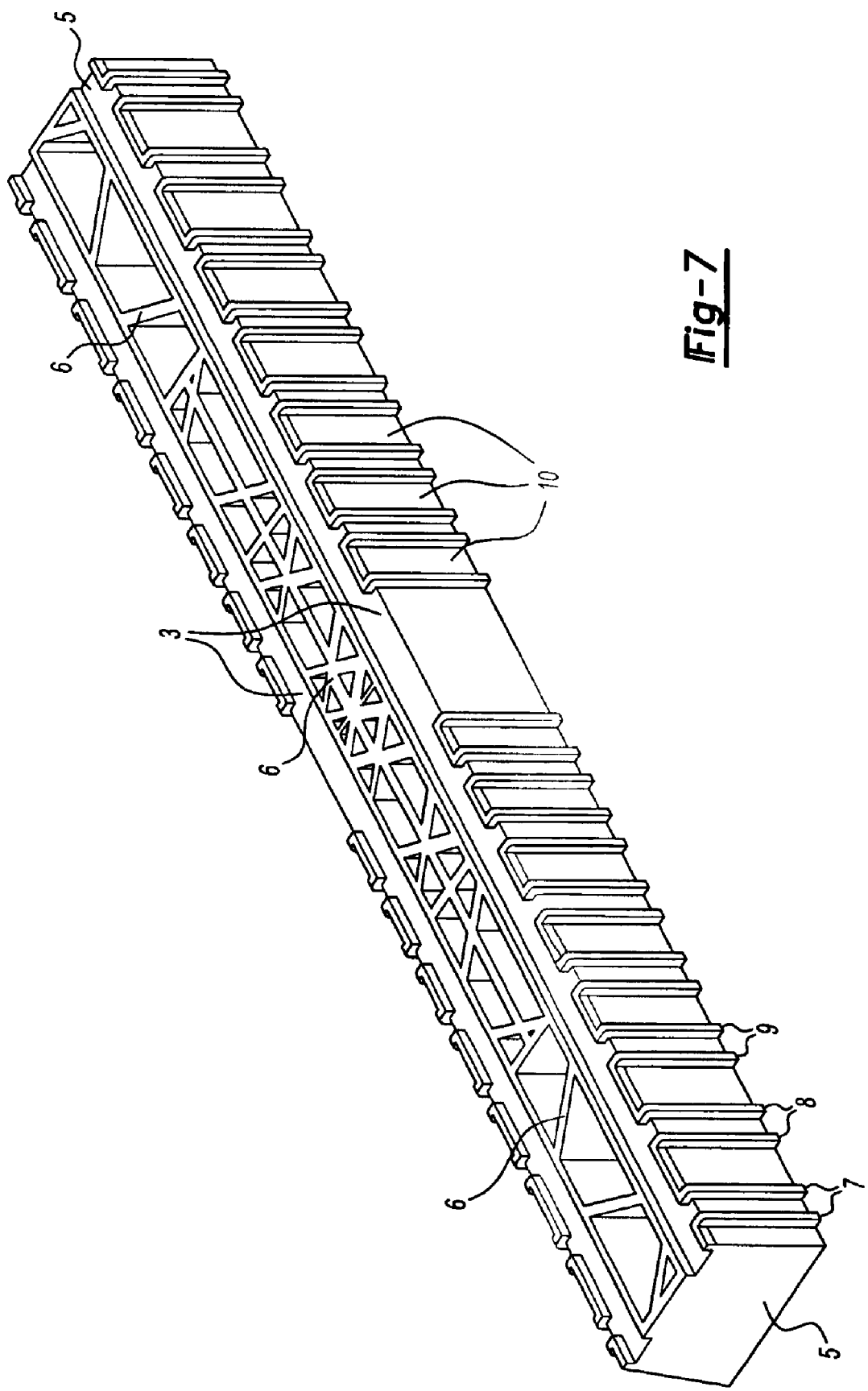
FIG. 7 shows a moulded structural reinforcing member provided with a plurality of pairs of ribs between which the expandable adhesive material may be located.

FIG. 7 shows a reinforcing member moulded from glass reinforced nylon employing the system illustrated in FIGS. 1B and 2B. The member consists of a structural reinforced component 5 provided with a labyrinth of reinforcing internal ribs 6. A series of pairs of ribs 7, 7; 8, 8; 9, 9 etc. are moulded into the external surface of the moulding. Expandable adhesive material (not shown) may then be deposited in the grooves formed between the pairs of ribs according to the present invention. The expandable adhesive material may also be located in channels 10 so that its expansion in a transverse direction is controlled by the ribs as shown by reference 3 in FIG. 4A. The moulding may then be used to provide structural reinforcement within a structure, such as a vehicle sub frame in the manner described herein.

The invention accordingly provides both ribbed mouldings containing unfoamed expandable adhesive and the reinforced hollow member containing the ribbed moulding bonded to the internal surface of the hollow structural member by the expanded adhesive.

Though illustrated herein by reference to M and U shape structures, other like structures may be employed that incorporate those shapes inverted, sideways, or the like (e.g., a W-shape would constitute an M-shape herein). Other letter shapes or geometries may be employed as well.

As illustrated the systems of the present invention enable improved or comparable reinforcement to be achieved whilst using a smaller amount of expandable adhesive material.

What is claimed is:

1. A structural reinforcing member for reinforcing a hollow structural member, comprising:
   a reinforcing member including a length, one or more external surfaces, a plurality of internal ribs and extensions adapted for opposing and approaching an internal surface of the hollow structural member when the reinforcing member is placed within the hollow structural member, wherein:
   i. the extensions are provided along the one or more external surfaces of the structural reinforcing member;

ii. the extensions are integrally molded as part of the reinforcing member;
iii. the extensions include two or more ribs;
one or more lugs attached to the reinforcing member so that the reinforcing member has minimal contact with an interior wall of the hollow structural member;
expandable adhesive material disposed upon one or more surfaces of the reinforcing member, wherein:
i. at least a portion of the expandable adhesive material is located in a channel between the two or more ribs, so that at least two sides of each of the two or more ribs are in contact with the expandable adhesive material;
ii. the expandable adhesive material is over-moulded or two shot injection moulded onto the reinforcing member;
iii. a clearance space of less than 10 millimeters is located between the expandable adhesive material and the interior wall of the hollow structural member enabling uniform expansion of the expandable adhesive material and uniform reinforcement of the hollow structural member.

2. A reinforcing member as in claim 1 wherein the extensions include a series of pairs of external ribs provided along the one or more external surfaces and masses of the expandable material are located between the ribs of each pairs of external ribs.

3. A reinforcing member as in claim 1 wherein at least one of the plurality of internal ribs extends longitudinally and multiple ribs of the plurality of ribs extend laterally relative to the length.

4. A reinforcing member as in claim 1 a reinforcing member as in claim 1 the reinforcing member is provided with holes or channel for enabling fluid drainage.

5. A reinforcing member as in claim 1 wherein the size of the reinforcing member including the expandable adhesive material is such that there is a small clearance between the extremity of the reinforcing member and the interior walls of the hollow structural member to allow for passage of any coating.

6. A reinforcing member as in claim 1 wherein the plurality of internal ribs provide a ribbed internal structure that provides reinforcement along several different axes.

7. A reinforcing member as in claim 1 wherein the reinforcing member is formed of materials including plastic.

8. A reinforcing member as in claim 1 wherein the reinforcing member is formed of materials including metal.

9. A reinforcing member as in claim 1 wherein at least one of the plurality of internal ribs is substantially perpendicular to length.

10. A reinforcing member as in claim 1 wherein the expandable material is dry and not tacky to touch.

11. A structural reinforcing member as in claim 1 wherein the expandable material can be activated at a temperature of a curing step in an electrocoat process.

12. A structural reinforcing member for reinforcing a hollow structural member, comprising:
a reinforcing member including a length, a first external surface generally opposite a second external surface, a plurality of ribs between the first surface and the second surface and extensions adapted for opposing and approaching an internal surface of the hollow structural member when the reinforcing member is placed within the hollow structural member, wherein:
i. the extensions are closer to the inner surface of the hollow structural member than the remaining bulk of the reinforcing member upon location of the reinforcement member within the hollow structural member;
ii. the extensions are integrally molded as part of the reinforcing member;
iii. the extensions include a series of pairs of external ribs provided along the first external surface and the second external surface of the reinforcing member;
one or more lugs attached to the reinforcing member so that the reinforcing member has minimal contact with an interior wall of the hollow structural member;
expandable material disposed upon one or more surfaces of the reinforcing member, wherein:
i. masses of the expandable material are located between the ribs of each pairs of external ribs, so that at least two sides of each of the external ribs are in contact with the expandable material;
ii. upon activation by exposure to heat, the expandable material expands and adheres to the hollow structural member; and
iii. the expandable material is over-moulded or two shot injection moulded onto the reinforcing member
iv. a clearance space of less than 10 millimeters is located between the expandable material and the interior wall of the hollow structural member enabling uniform expansion of the expandable material and uniform reinforcement of the hollow structural member.

13. A reinforcing member as in claim 12 wherein at least one of the plurality of ribs extends longitudinally and multiple ribs of the plurality of ribs extend laterally relative to the length.

14. A reinforcing member as in claim 12 a reinforcing member as in claim 1 the reinforcing member is provided with holes or channel for enabling fluid drainage.

15. A reinforcing member as in claim 12 wherein the plurality of internal ribs provide a ribbed internal structure that provides reinforcement along several different axes.

16. A reinforcing member as in claim 12 wherein the expandable material is located upon the reinforcing member such that it provides adhesion to two non-parallel surfaces of the hollow structural member to give rigidity in at least two dimensions.

17. A reinforcing member as in claim 12 wherein the expandable adhesive material be applied over at least part of each of the top and bottom and the sides of the reinforcing member.

18. A structural reinforcing member for reinforcing a hollow structural member, comprising:
a reinforcing member including a length, a first external surface generally opposite a second external surface, a plurality of ribs between the first surface and the second surface and a plurality of extensions adapted for opposing and approaching an internal surface of the hollow structural member when the reinforcing member is placed within the hollow structural member, wherein:
i. at lease one of the plurality of ribs extends longitudinally and multiple ribs of the plurality of ribs extend laterally relative to the length;
ii. the extensions are closer to the inner surface of the hollow structural member than the remaining bulk of the reinforcing member upon location of the reinforcement member within the hollow structural member;
iii. the reinforcement member has an exterior profile shape conforming substantially to the cross section of the hollow structural member;
iv. the shape of the reinforcing member varies along the length of the reinforcing member like the dimensions of the cross section of the hollow structural member change;

v. the extensions are provided on the first external surface and the second external surface of the structural reinforcing member;
vi. the reinforcing member is formed of injection molded thermoplastic;
vii. the reinforcing member is provided with holes or channel for enabling fluid drainage;
viii. the extensions are integrally molded as part of the reinforcing member;
ix. the extensions include a series of pairs of ribs spaced apart along the first external surface and the second external surfaces of the reinforcing member;

one or more lugs attached to the reinforcing member so that the reinforcing member has minimal contact with an interior wall of the hollow structural member;

expandable adhesive material disposed upon one or more surfaces of the reinforcing member, wherein:

i. masses of the expandable adhesive material are located between the ribs of the pairs of ribs, so that at least two sides of each of the ribs are in contact with the expandable adhesive material;
ii. upon activation by exposure to heat, the expandable material expands and adheres to the hollow structural member;
iii. the expandable adhesive material is over-moulded or two shot injection moulded onto the reinforcing member; and
iv. a clearance space of less than 10 millimeters is located between the expandable adhesive material and the interior wall of the hollow structural member enabling uniform expansion of the expandable adhesive material and uniform reinforcement of the hollow structural member.

* * * * *